United States Patent [19]
Lundh

[11] Patent Number: 6,065,380
[45] Date of Patent: May 23, 2000

[54] SAW BLADE AND METHOD AND METHOD AND APPARATUS FOR FORMING GROUPED SAW BLADE TEETH

[76] Inventor: Jan Lundh, Munkflohögen (Jämtland), 83060 Fölinge, Sweden

[21] Appl. No.: 08/436,474

[22] PCT Filed: Oct. 28, 1993

[86] PCT No.: PCT/SE93/00895

§ 371 Date: Nov. 1, 1995

§ 102(e) Date: Nov. 1, 1995

[87] PCT Pub. No.: WO94/09936

PCT Pub. Date: May 11, 1994

[30] Foreign Application Priority Data

Oct. 28, 1992 [SE] Sweden .................................. 9203186

[51] Int. Cl.⁷ .............................. B26D 1/00; B23D 57/00; B23D 65/02
[52] U.S. Cl. ..................................... 83/35; 83/36; 83/847; 83/851; 76/29; 76/112; 30/355
[58] Field of Search .............................. 83/835, 836, 837, 83/847, 848, 849, 850, 851, 852, 697, 350, 36, 55; 30/355, 356, 357; 76/29, 112

[56] References Cited

U.S. PATENT DOCUMENTS

| 269,728 | 12/1882 | Simonds | 30/355 |
|---|---|---|---|
| 386,183 | 7/1888 | Brooks | 30/355 |
| 601,343 | 3/1898 | Johnson | 83/852 |
| 1,379,973 | 5/1921 | Gillespie | 30/355 |
| 1,497,577 | 6/1924 | Morzsa | 30/355 |
| 1,576,908 | 3/1926 | Hartig | 76/29 |
| 1,710,039 | 4/1929 | Bauer | 30/355 |
| 1,710,142 | 4/1929 | Berg | 30/355 |
| 3,540,317 | 11/1970 | Stanley | 76/112 |
| 3,949,635 | 4/1976 | Daniels | 83/405 |

FOREIGN PATENT DOCUMENTS

| 0205245 A1 | 12/1986 | European Pat. Off. . |
|---|---|---|
| 2 177 344 | 1/1987 | United Kingdom . |

OTHER PUBLICATIONS

Derwent's abstract, No. 82–E6198E/16, week 8216, Abstract of SU. A, 844285 (Wood Mech Work Res) Jul. 30, 1981.

Derwent's abstract, No. 80–A4226C/02, week 8002, Abstract of US. A, 4179967 (Stanadyne Inc), Dec. 25, 1979.

Derwent's abstract. No. 88–118237/17, week 8817, Abstract of SU. A, 1340938 (Gomel Tech Equiping), Sep. 30, 1987.

*Primary Examiner*—M. Rachuba
*Attorney, Agent, or Firm*—Finnegan, Henderson, Farabow, Garrett & Dunner, L.L.P.

[57] ABSTRACT

This invention concerns a saw blade (S) including at least one part with fine teeth (6) and at least one part with grouped teeth (7). The part of the blade with grouped teeth (7) includes a number of groups (4) of, for example, V-shaped indentations (10) in the blade (S), each pair of indentations defining a saw tooth (1). Each group (4) comprises an even number of indentations. In an arbitrary group (e.g. indentations one, three, five, etc.) a first imaginary line A), drawn between alternate tips (11) or base, is a straight line which forms a small angle (a) in relation to the longitudinal direction of the saw blade, the tips or bases being evenly distributed along the line. The invention also concerns a method and a device for producing a saw blade with grouped teeth by means of a tool comprising a punch and a punch die. The punch for cutting out the saw teeth is completely symmetrical and has substantially V-shaped tips. A saw blade blank is fed through the tool and cut in at least two stages. In order to form a group in a group-toothed part, in a first step, either the blank is tilted from a starting position at an angle (a) to the tool or vice versa.

9 Claims, 6 Drawing Sheets

SAW BLADE AND METHOD AND METHOD AND APPARATUS FOR FORMING GROUPED SAW BLADE TEETH

THE TECHNICAL AREA OF THE INVENTION

The invention in question relates to a sawblade preferably intended to be used in a bowsaw, wherein the saw-teeth are grouped in several groups, and also a procedure and a device to produce this sawblade.

TECHNICAL BACKGROUND

Within the above mentioned technical area many different solutions exist to improve a sawblade by varying and changing the teeth of the sawblade in different ways to increase the safety and efficiency when using a saw.

The most common sawblades on the market are group-toothed blades (that is blades with irregular distance between the tooth-tips) the number of teeth can be 3, 4 or 5 teeth per inch.

When manufacturing group-toothed sawblades a punching tool consisting of punch and die with the same profile as the blade being produced is normally used. With this tool one can only produce sawblades with one type of toothing.

One purpose in making a sawblade with teeth in group is to neutralize the resonance that easily occurs in a sawblade that has been fastened in an arc. The blade may then act like a string on a guitar, that has a given tone.

In a sawblade without teeth in group vibrations easely occur, as the tooth-tips of the sawblade can strike against the wood-fibers. This can be compared to the tooth-points acting like a number of small axes chopping off the wood-fibers at an even frequency. The chance is great that this frequency is equivalent with the that of blade itself, so that resonance occurs, causing vibrations in the sawblade.

This can be shown by the following example. If you assume that a 30" (762 mm) long blade with 150 teeth has a tension that gives a normal A (440 Hz) in frequency and the saw is moved at a speed that gives one sawstroke in 0.34 second, which is a fairly normal speed, the points will strike against the treefibers with a frequency that corresponds with the sawblades own frequency. This leads to resonance and accompanying strong vibrations.

Corresponding risks for resonance naturally exist at other sawing speeds that are equivalent to different under and overtones, like an octave or a quint etc. The result of this is that the sawblade tends to brake in the sawtrack which leads to more heavy sawing.

These problems has been solved through the arrangement of irregular distance between the points.

This causes several tones to occur (dissonance). These vibrations neutralize each other making that the saw goes "quiet", that is, free of vibrations and accordingly running easier in the track.

Saws for fast cutting have relatively big teeth. With this type of toothing it is difficult to begin a sawstroke, that is, from a level where the speed of the sawblade is 0 and hereby being able to make a sawstroke avoiding that the sawblade jumps risking an injury both in the hand that is holding the work-piece and the work-piece itself. Injuries of this kind are one of the most common on constructing-sites, they cause much inconvenience and a lot of unnecessary suffering.

One solution to the problem with jumping bowsaws is the so called push-off sawblade, that is, a sawblade with fine teeth in the front part of the blade, with the purpose to make the start of the stroke easier, followed by bigger teeth for higher performance.

When manufacturing a sawblade with finer, closer toothing in the front of the blade, within the intention that one at the start of a cutting (that is, from the level where the speed of the sawblade is 0) shall be able to make a sawstroke without the saw jumping, one has up to now had to cut the blade in several different tools.

Some examples of different constructions and production methods for sawblades are shown in EP-A1-205 245, DE-C-565 136, FR-A-1 586 519 and GB-A-2 177 344

Short presentation of the invention idea.

The purpose of the invention in question is to provide a sawblade for instance for bowsaws (arcsaws), that unites the advantages of both the types of blades mentioned above and at the same time is easy and cheap to manufacture.

In accordance with the inventionidea one receives a sawblade with at least one push-off part and at least one part with teeth in group, wherein the part of the blade with teeth in group includes a number of groups of preferably V-shaped notches in the blade, wherein each pair of notches defines a sawtooth, and wherein each group is comprised of an even number of notches, and that an imaginary line A that is drawn between each alternate bottom of a selected group, e.g. notch one, three, five, etc. is a straight line which establish a small angle, alfa, to the longitudinal direction of the sawblade whereby the bottoms and the tips are uniformly distributed along the line.

According to the inventionidea a group-toothed sawblade is produced by means of a tool comprised of a punch and a die, wherein the punch cutting out the sawteeth is constructed fully symmetrically with essentially V-shaped points, wherein a sawblade-blank conveniently in the form of a steel-bandis fed through said tool, and the blank is punched in at least two stages with one and the same tool wherein the blank for the purpose of forming one group in a group-toothed part in a first stage from a starting position is tilted a small angle, alfa, relative to the punchingtool and the blank is punched against the die, whereafter the blank is advanced through the tool a distance which corresponds to half the width of a tooth, calculated on a punchingtool tooth, and the blank in a second step is tilted back relative to the tool in an opposite direction to at least the starting position and is punched, whereafter the method is repeated until the desired number of groups have been formed.

By combining the quiet stroke of the group-toothed sawblade with the safety of the push-off toothed blade, one receives a sawblade that is easy to saw with, since the resonance in the blade almost has been eliminated and the chance that the saw jumps and causes the user injuries in the start is very small.

Short description of attached drawings.

The invention will below be described with reference to accompanying drawings.

DESCRIPTION IN DETAIL OF A PREFERRED PERFORMANCE OF THE INVENTION

Figure 1:
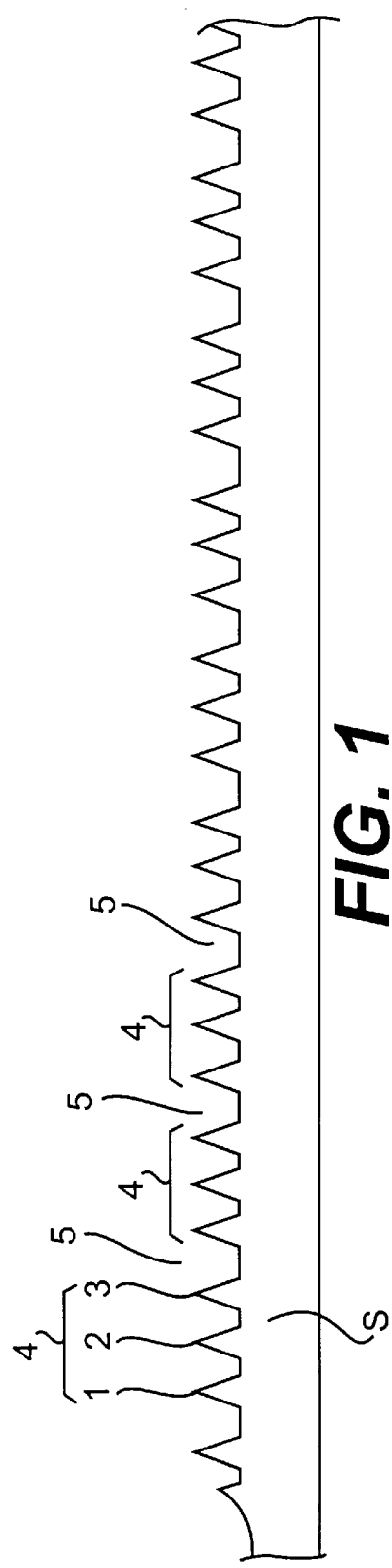
FIG. 1 shows a group-toothed standard sawblade.
Figure 2:
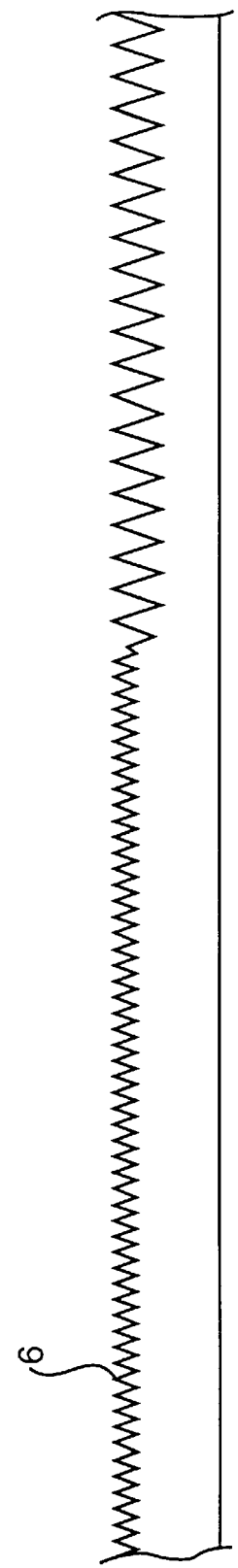
FIG. 2 shows a sawblade with push-off teeth at one end.

In FIGS. 1 and 2 the preknown technique is presented.

In FIG. 1 is shown a group-toothed sawblade with several groups 4 that in each group has three sawteeth 1,2 and 3 and between each group 4 a space 5. All teeth are equal and all groups have the same amount of teeth. In FIG. 2 a sawblade is shown that has one part 6, at one end, which is push-off toothed to make the starting up of every sawing operation easier.

Figure 2A:
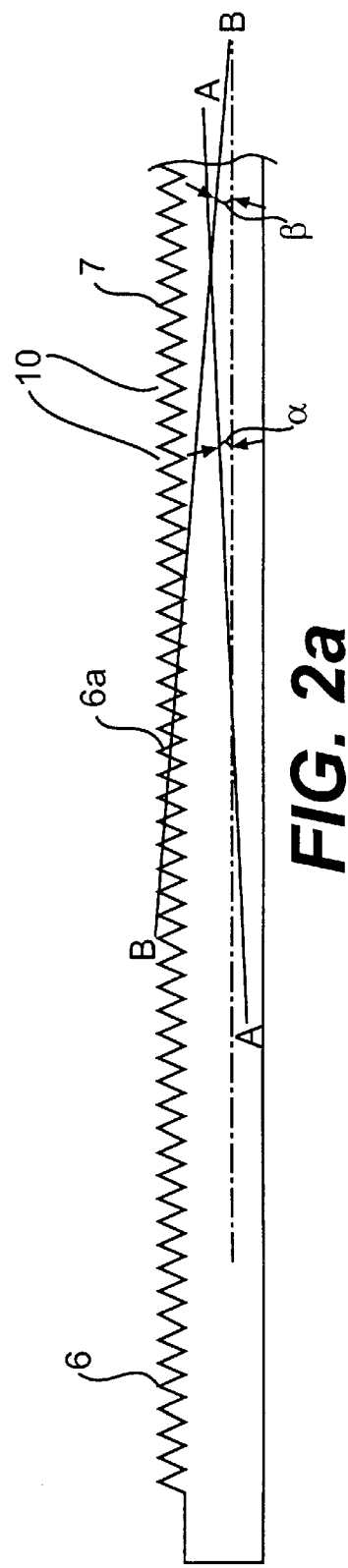
FIG. 2a shows a sawblade which is both push-off and group-toothed according to the invention.

In FIG. 2a is shown a push-off and group-toothed sawblade according to the invention. At one end of the sawblade the push-off-toothed parts 6, 6a are shown connected to a group-toothed part 7.

Figure 3:
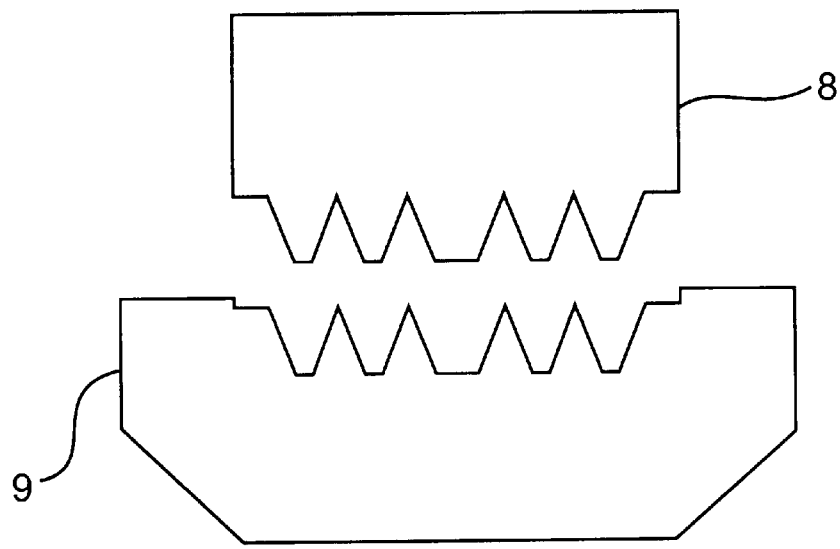
FIG. 3 shows a punching device for the manufacturing of a conventionell group-toothed sawblade.
Figure 4:
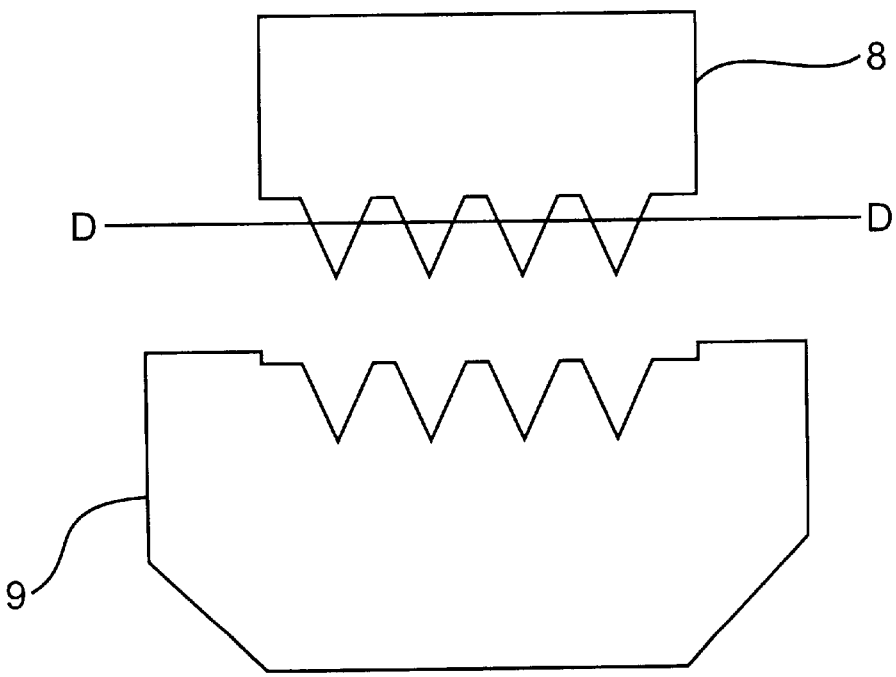
FIG. 4 shows a punchingdevice for manufacturing of a sawblade according to the invention.

FIG. 3 shows a standard punching device for manufacturing group-toothed sawblades. The sawbladeblank is placed in a punching device including the punch 8 and the die 9 which have the same profile as the ready made sawblade. The tool according to the invention, is shown in detail in FIG. 4 and has the same tooth-height, tooth-width, tooth-side and tooth-space all along the punch-tool. Each tooth on the punchtool punches two different V-shaped notches in each group, in the complete group-toothed sawblade.

As shown in FIG. 2a a sawblade according to a discoursed performance, consists one push-off part, and one group-toothed part.

The blade is intended to be used in a bowsaw (arcsaw). The group-toothed part of the blades contains several groups of preferably V shaped notches in the blade, and each pair of notches defines one sawtooth. Each group consists of an even number of notches. One first imagined line A, which is drawn between every other bottom in a arbitrary group, for example, the bottom of first, third and fifth notches, is a straight line and defines a small angle (alfa) with the longitudinal direction of the sawblade. The bottoms are uniformly distributed along the line.

A second straight imaginary line B, drawn between remaining notch bottoms, for example, the bottoms of second, fourth and sixth notches is a straight line which defines a small angle (beta) with the longitudinal direction of the saw blade. The bottoms are distributed uniformly along the line B.

A third imaginary line C drawn between the points of the teeth of the sawblade, is a straight line which extends parallel to the longitudinal direction of the sawblade. The points of the sawteeth in the grouped-toothed part 7 are spaced unevenly along the line C.

In FIGS. 5 and 6a–6e is shown a device for manufacturing a push-off and/or a group-toothed sawblade S containing a punchingdevice in the shape of a punch 8 collaborating with a die 9 for punching a sawbladeblank. The working parts of the punch 8 are symmetrically shaped. The device further more includes slides that guide the blank through the punchingtool. The arrangement is provided with means that facilitate a certain tilting of the blank both ways obliquely relative to the punch 8 and the die 9.

In FIG. 3 a fourth imaginary line D is shown, which is drawn through, the punch 8 where the width of the tooth 1 is the same as the distance to the next tooth 2. The arrangement is further more provided with means to vary the distance between the blank and line D.

In this described preferred performance tilting and distance variation are brought about by the slides.

The arrangement also includes means for advancing the blank through the punchingtool.

Means for tilting, distance variation and advancing is preferably controlled automatically, for instance by a computer program in advance stored in a microprocessor or a computer.

The manufacturing process of a group-toothed sawblade with the described device is done as follows. A sawbladeblank preferably in the shape of a steelband is fed through the punchtool 8,9. The blank S is punched in at least two steps with one and the same tool. The blank is tilted obliquely a small angle (alfa) relative to the punchtool in a first stage from a starting position for the purpose of forming one group in a group-toothed part 7. The blank S is then punched against the die. The blank is thereafter advanced through the punchtool a distance which corresponds to half the width of a tooth calculated on a punchtool tooth. In a second step the blank is tilted back relative to the punchingtool to at least the starting position and tilted to a small angle (beta) relative to the punchingtool in the opposite direction to said angle (alfa) and punched. The procedure is repeated until the desired number of groups have been formed.

The angle alfa is normally equivalent with angle beta.

In the purpose of obtaining a push-off part the sawbladeblank may in one procedure step be oriented parallel with line D, but slightly spaced from as to obtain relatively low sawteeth. Hereby a determined number of sawteeth will be accommodated between two mutually adjacent punchtool teeth. Thereafter the blank is punched and advanced a distance corresponding to one of the teeth in the number of teeth that are accommodated between two mutually adjacent punchtool teeth. The procedure step is repeated until a desired length of the push-offpart is obtained.

To obtain a transition between a push-off and a group-toothed part one or both of following methods can be used. In the first the distance between the blank and line D is reduced to obtain a section of the push-offpart that has slightly higher teeth. In the second, the angles alfa and beta are increased successively, at a predetermined number of groups at the transition from a push-offtoothed part, to a group-toothed part, from a small angle to a predetermined maximum angle at the same time as the distance between line D and the blank is decreased successively.

As mentioned above the procedure may be run automatically by means of a computer program stored in a microprocessor or a computer, which is a great advantage as the sawblade due to this can be made in an endless number of variations.

Within the limits of the invention modifications may exist as the tool can be tilted instead of the blank in corresponding degree, and the tool can be moved in relation to the blank at the push-off-toothing. The angle alfa and beta may be varied one bydone and in relation to each other within the limits of the invention.

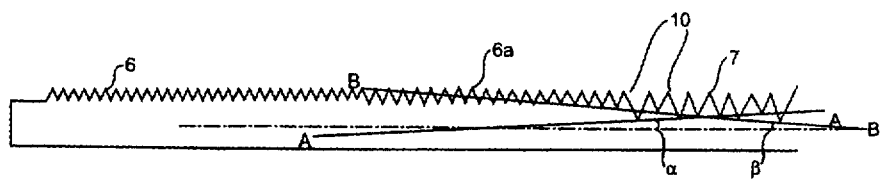

What is claimed is:

1. A method for producing a group-toothed saw blade or saw blade portion using a tool comprising a punch and a die, for punching-out saw teeth having spaced tooth tips alternating with spaced tooth notches, the punch being constructed symmetrically with at least two generally V-shaped points spaced by a distance equal to twice the spacing of notches in group-toothed saw teeth, wherein a saw-blade blank is fed through the tool and punched to form at least two tooth notches with each punching stroke of the tool, comprising the steps of:

(a) obliquely tilting the blank or the tool relative to each other from a starting position in a first direction through a first small angle (α) relative to an imaginary line (D) through the tool or the blank to a first punching position and, in the first punching position, forming one group of tooth notches in a group-toothed part of the blank, the imaginary line (D) being parallel to a relative tool/blank position that would result in forming the at least two tooth notches to be of equal depth;

(b) advancing the blank through a distance corresponding to the one half of a distance between the generally V-shaped tips on the punch;

(c) obliquely tilting the blank or the tool relative to each other from the first punching position in a direction opposite to said first direction to a second punching position, the relative tilting in the second punching position making a second small angle (β) with the imaginary line (D), the angle (β) being of an absolute value at least equal to the first angle (α), and, in the second punching position, forming another group of tooth notches, staggered relative to the first group of notches, in the group-toothed part of the blank; and (d) repeating steps (a), (b) and (c) until the desired number of groups of saw teeth have been formed.

2. The method of claim 1 comprising additional steps of forming relatively fine teeth in a saw starting portion of the blank and having a fine tooth width equal to a whole number of distance increments between the generally V-shaped points, the additional steps including:

(e) positioning the saw blade blank in parallel with the imaginary line (D) and spaced from the tool to locate the generally V-shaped points at a position corresponding to the depth of notches between the relatively fine teeth;

(f) punching the notches of at least two relatively fine teeth;

(g) advancing the blank and tool relative to each other through a distance corresponding to one of the relatively fine teeth; and (h) repeating steps (e), (f) and (g) until a saw starting portion of desired length is obtained.

3. The method of claim 2, including a step of forming a transition portion between a group-toothed portion and a saw starting portion of the blank by reducing the distance between saw-blade blank and the tool so that a section of the start-toothed part will have slightly higher teeth.

4. A method of claim 3 wherein the angles α and β are increased progressively from a small value to a predetermined maximum value while the distance between the tool and the blank is decreased to obtain a gradual transition from said saw start portion to the group-toothed portion of the blank.

5. A longitudinal bow saw blade having at least one group-toothed portion comprising a plurality of groups of saw teeth each defined by a pair of generally V-shaped notches having bottoms, each group of saw teeth comprising an even number of notches, wherein a first imaginary straight line (A) drawn between the bottoms of alternate notches of a selected group defines a small first angle (α) with the longitudinal direction of the saw blade, the saw teeth defined by the alternate notches being spaced uniformly along the line (A), and wherein a second imaginary straight line (B), drawn between the bottoms of remaining notches of the selected group, defines a small second angle (β) with the longitudinal direction of the saw blade in a direction opposite to the small first angle (α), the saw teeth defined by the remaining notches being spaced uniformly along the line (B).

6. The saw blade of claim 5, wherein a third imaginary line (C) drawn between tips on the teeth of the saw blade is a straight line which extends parallel with the longitudinal direction of the saw blade, wherein the tips of the teeth are spaced unevenly along the third line (C).

7. An apparatus for making a longitudinal saw blade having a start-toothed portion having teeth of equal depth, and a group-toothed portion having teeth of varying depth, comprising:

a clipping tool having a punch and a die for clipping a saw blade blank, the punch being symmetrical and having at least two generally V-shaped points for simultaneously clipping at least two saw tooth bottoms;

guide means for guiding the blank through the tool;

means for obliquely tilting the blank from a starting position through a small first angle (α) to an imaginary line (D) through the tool; and means for varying the distance between the blank and the clipping tool.

8. The apparatus of claim 7 also including means for advancing the blank through the tool.

9. The apparatus of claim 7, wherein said means for tilting the blank and for achieving said variation in distance from the clipping tool is controlled automatically by means of a computer program stored in a microprocessor or computer.

* * * * *

UNITED STATES PATENT AND TRADEMARK OFFICE
CERTIFICATE OF CORRECTION

PATENT NO.   : 6,065,380                                  Page 1 of 4
DATED        : May 23, 2000
INVENTOR(S)  : Lundh It is certified that error appears in the above-identified patent and that said Letters Patent is hereby corrected as shown below:

<u>Title page,</u>
The title page, showing an illustrative figure, should be deleted and substitute with therefore the attached title page.

Figure 5:
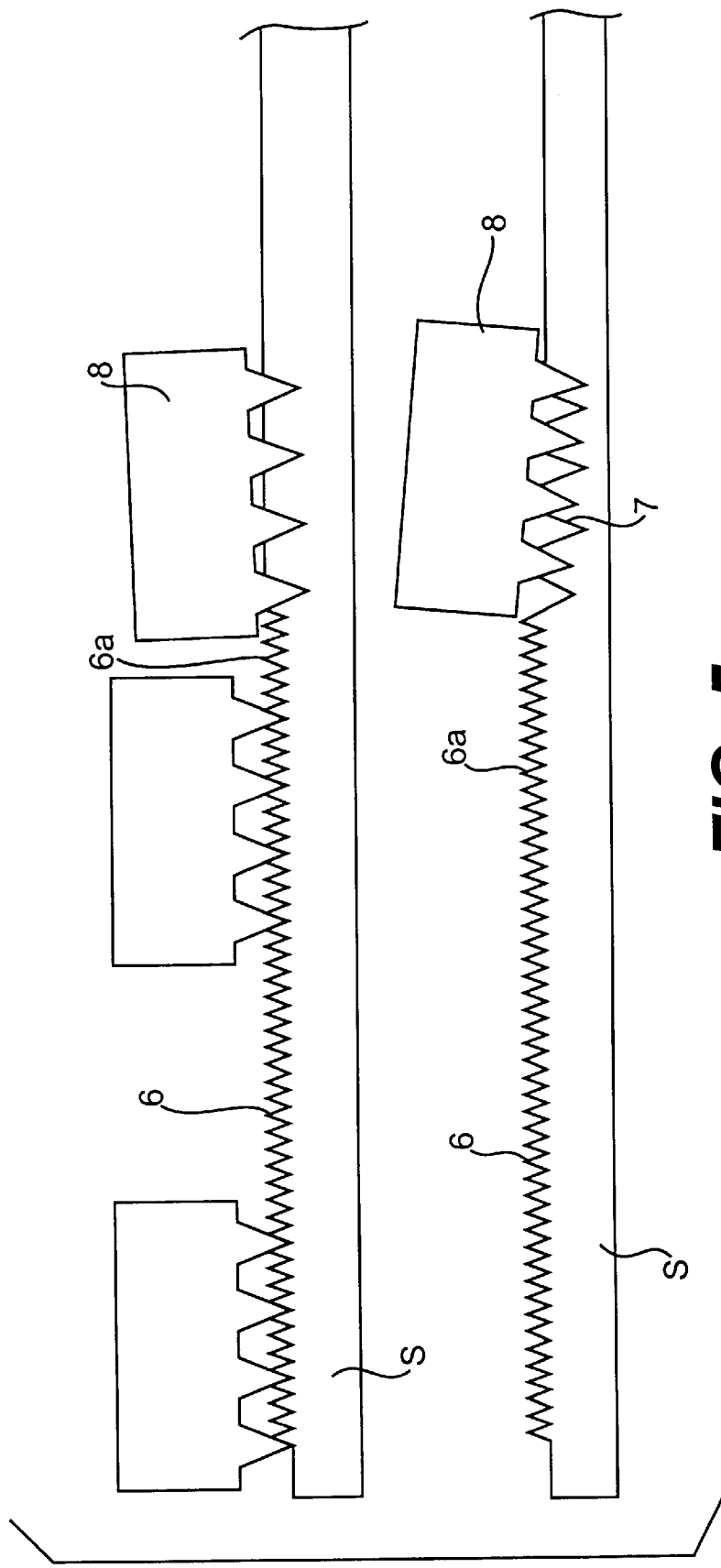
FIG. 5 shows how a sawbladeblank is punched according to the invention, when the punchtool is tilted in relative to the sawbladeblank.

<u>Drawings,</u>
Sheet 3, Fig. 5, the drawing should appear as follows:

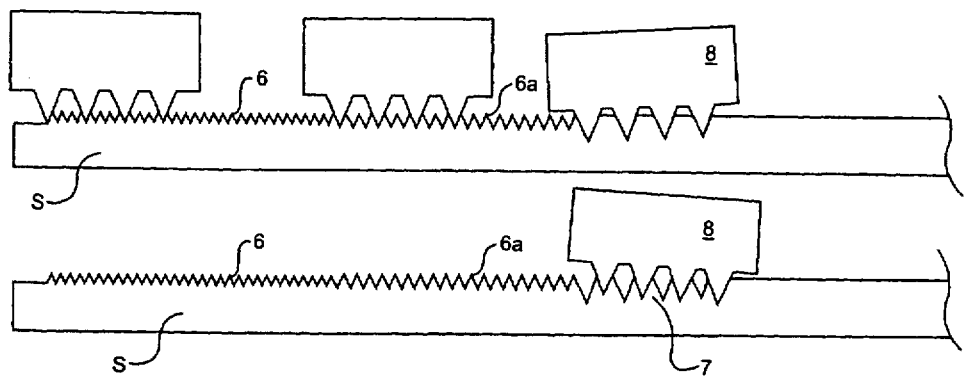

FIG. 5

Figure 6A:
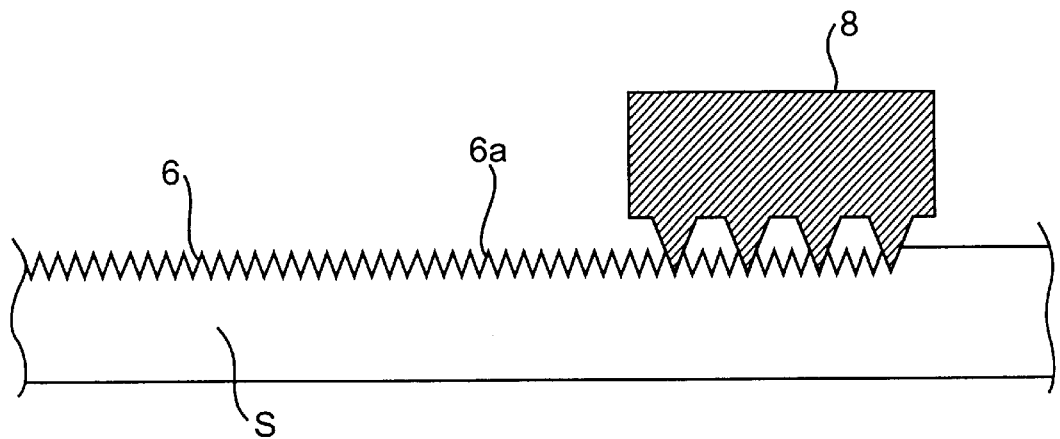
FIGS. 6a–6e shows how a sawbladeblank is punched according to the invention, when the sawbladeblank is tilted relative to the punch-tool.
Figure 6B:
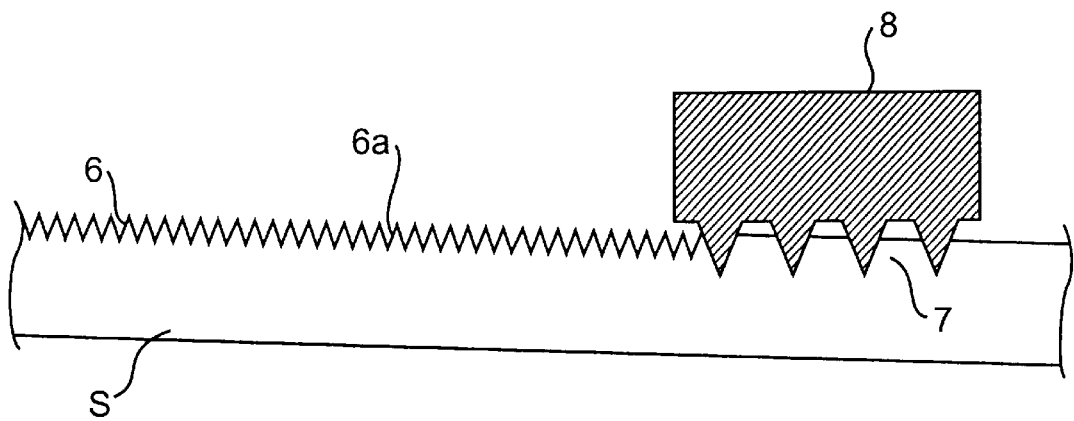

Sheet 4, Figs. 6a and 6b, the drawings should be appear as follows:

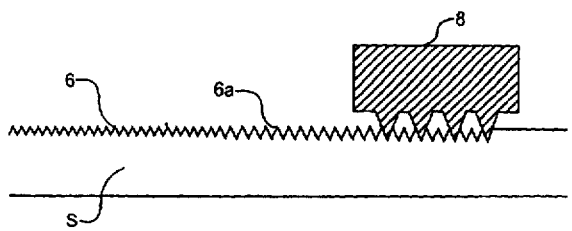

FIG. 6a

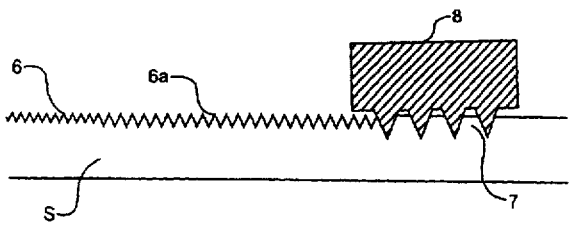

FIG. 6b

UNITED STATES PATENT AND TRADEMARK OFFICE
CERTIFICATE OF CORRECTION

PATENT NO. : 6,065,380
DATED : May 23, 2000
INVENTOR(S) : Lundh

Figure 6C:
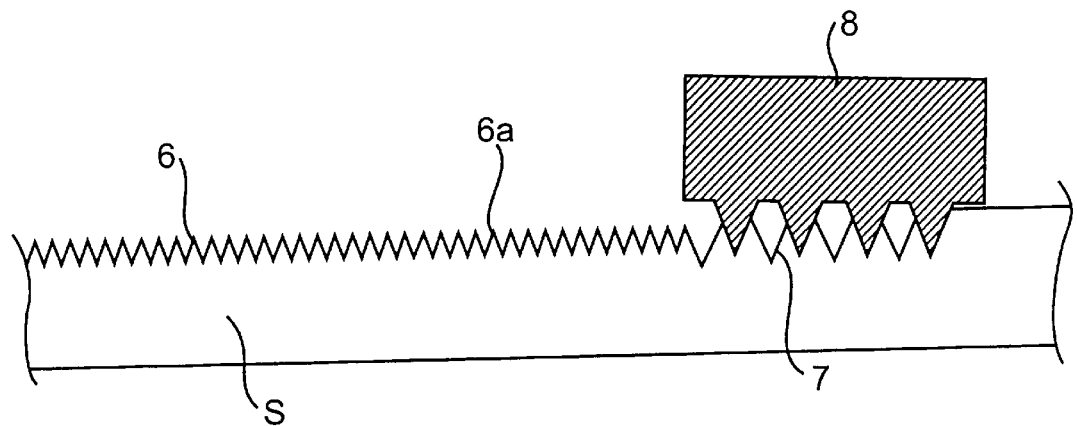
Figure 6D:
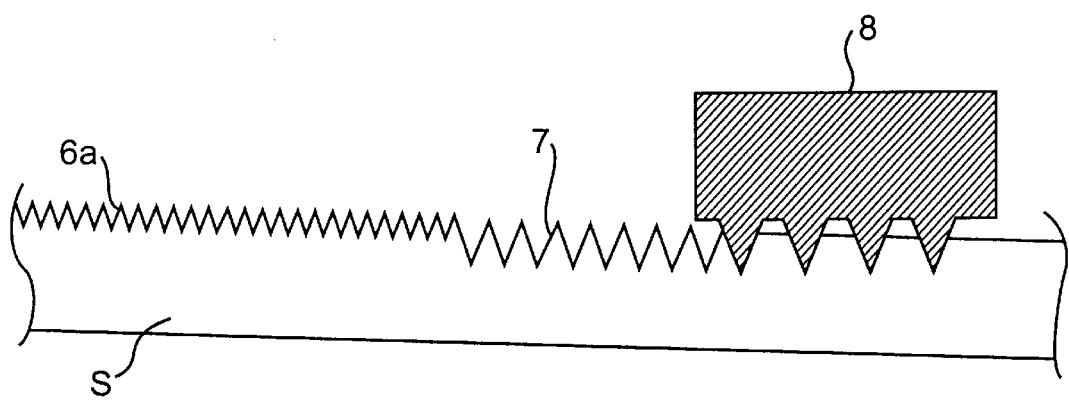

It is certified that error appears in the above-identified patent and that said Letters Patent is hereby corrected as shown below:

Sheet 5, Figs. 6c and 6d, the drawings should appear as follows:

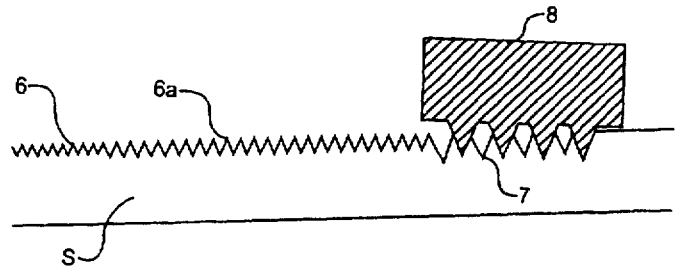

FIG. 6c

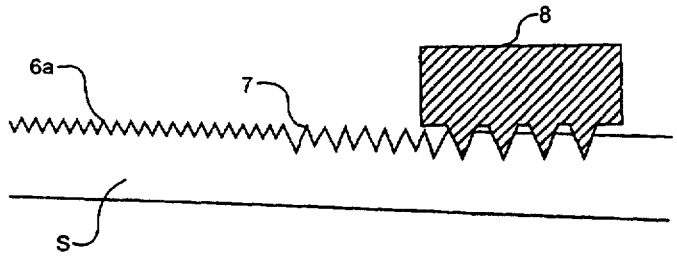

FIG. 6d

Figure 6E:
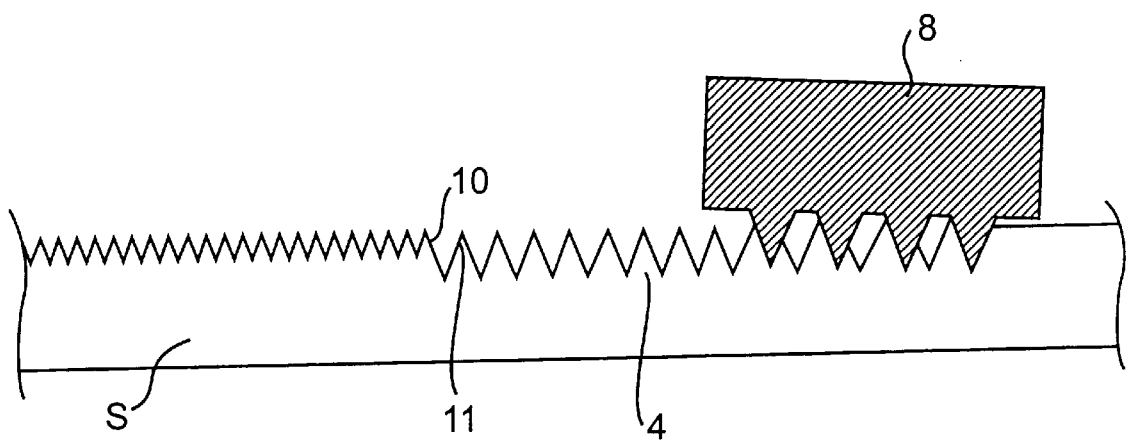

Sheet 6, Fig 6e, the drawing should appear as follows:

UNITED STATES PATENT AND TRADEMARK OFFICE
CERTIFICATE OF CORRECTION

PATENT NO.    : 6,065,380　　　　　　　　　　　　　　　　　　　Page 3 of 4
DATED         : May 23, 2000
INVENTOR(S)   : Lundh It is certified that error appears in the above-identified patent and that said Letters Patent is hereby corrected as shown below:

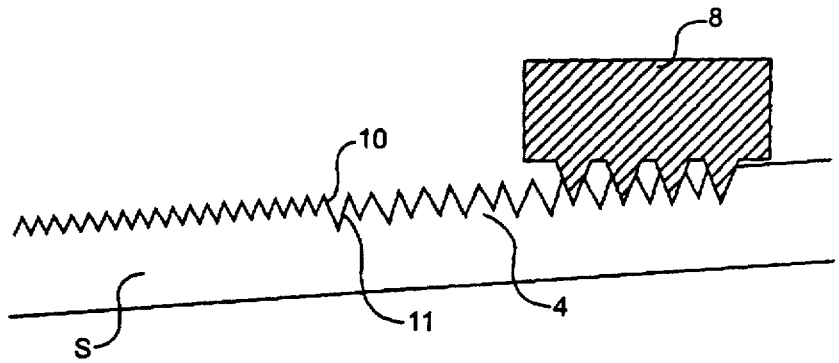

FIG. 6e

Signed and Sealed this

Fourteenth Day of May, 2002

Attest:

JAMES E. ROGAN
Attesting Officer　　　Director of the United States Patent and Trademark Office

United States Patent [19]
Lundh

[11] Patent Number: 6,065,380
[45] Date of Patent: May 23, 2000

[54] SAW BLADE AND METHOD AND METHOD AND APPARATUS FOR FORMING GROUPED SAW BLADE TEETH

[76] Inventor: Jan Lundh, Munkflohögen (Jämtland), 83060 Fölinge, Sweden

[21] Appl. No.: 08/436,474
[22] PCT Filed: Oct. 28, 1993
[86] PCT No.: PCT/SE93/00895
   § 371 Date: Nov. 1, 1995
   § 102(e) Date: Nov. 1, 1995
[87] PCT Pub. No.: WO94/09936
   PCT Pub. Date: May 11, 1994

[30] Foreign Application Priority Data

Oct. 28, 1992 [SE] Sweden .................. 9203186

[51] Int. Cl.$^7$ .............. B26D 1/00; B23D 57/00; B23D 65/02
[52] U.S. Cl. .............. 83/35; 83/36; 83/847; 83/851; 76/29; 76/112; 30/355
[58] Field of Search .............. 83/835, 836, 837, 83/847, 848, 849, 850, 851, 852, 697, 350, 36, 55; 30/355, 356, 357; 76/29, 112

[56] References Cited

U.S. PATENT DOCUMENTS

| | | | |
|---|---|---|---|
| 269,728 | 12/1882 | Simonds | 30/355 |
| 386,183 | 7/1888 | Brooks | 30/355 |
| 601,343 | 3/1898 | Johnson | 83/852 |
| 1,379,973 | 5/1921 | Gillespie | 30/355 |
| 1,497,577 | 6/1924 | Morzsa | 30/355 |
| 1,576,908 | 3/1926 | Hartig | 76/29 |
| 1,710,039 | 4/1929 | Bauer | 30/355 |
| 1,710,142 | 4/1929 | Berg | 30/355 |
| 3,540,317 | 11/1970 | Stanley | 76/112 |
| 3,949,635 | 4/1976 | Daniels | 83/405 |

FOREIGN PATENT DOCUMENTS

| | | | |
|---|---|---|---|
| 0205245 A1 | 12/1986 | European Pat. Off. | |
| 2 177 344 | 1/1987 | United Kingdom | |

OTHER PUBLICATIONS

Derwent's abstract, No. 82–E6198E/16, week 8216, Abstract of SU. A, 844285 (Wood Mech Work Res) Jul. 30, 1981.

Derwent's abstract, No. 80–A4226C/02, week 8002, Abstract of US. A, 4179967 (Stanadyne Inc), Dec. 25, 1979.

Derwent's abstract, No. 88–118237/17, week 8817, Abstract of SU. A, 1340938 (Gomel Tech Equiping), Sep. 30, 1987.

*Primary Examiner*—M. Rachuba
*Attorney, Agent, or Firm*—Finnegan, Henderson, Farabow, Garrett & Dunner, L.L.P.

[57] ABSTRACT

This invention concerns a saw blade (S) including at least one part with fine teeth (6) and at least one part with grouped teeth (7). The part of the blade with grouped teeth (7) includes a number of groups (4) of, for example, V-shaped indentations (10) in the blade (S), each pair of indentations defining a saw tooth (1). Each group (4) comprises an even number of indentations. In an arbitrary group (e.g. indentations one, three, five, etc.) a first imaginary line A), drawn between alternate tips (11) or base, is a straight line which forms a small angle (a) in relation to the longitudinal direction of the saw blade, the tips or bases being evenly distributed along the line. The invention also concerns a method and a device for producing a saw blade with grouped teeth by means of a tool comprising a punch and a punch die. The punch for cutting out the saw teeth is completely symmetrical and has substantially V-shaped tips. A saw blade blank is fed through the tool and cut in at least two stages. In order to form a group in a group-toothed part, in a first step, either the blank is tilted from a starting position at an angle (a) to the tool or vice versa.

9 Claims, 6 Drawing Sheets